United States Patent
Chen et al.

(10) Patent No.: US 8,610,685 B2
(45) Date of Patent: Dec. 17, 2013

(54) POSITIONING METHOD AND DRIVING APPARATUS OF TOUCH PANEL

(75) Inventors: Po-Yang Chen, Miao-Li County (TW); Po-Sheng Shih, Miao-Li County (TW); Chien-Yung Cheng, Miao-Li County (TW)

(73) Assignee: Chimei InnoLux Corporation, Miaoli County (TW)

( * ) Notice: Subject to any disclaimer, the term of this patent is extended or adjusted under 35 U.S.C. 154(b) by 243 days.

(21) Appl. No.: 13/276,323

(22) Filed: Oct. 19, 2011

(65) Prior Publication Data
US 2012/0092282 A1 Apr. 19, 2012

(30) Foreign Application Priority Data
Oct. 19, 2010 (CN) .......................... 2010 1 0511551

(51) Int. Cl.
*G06F 3/041* (2006.01)
(52) U.S. Cl.
USPC .......................................... 345/173; 345/179
(58) Field of Classification Search
USPC .................................. 345/173–179
See application file for complete search history.

(56) References Cited

U.S. PATENT DOCUMENTS

| 2007/0132737 A1* | 6/2007 | Mulligan et al. ............... 345/173 |
| 2011/0025636 A1* | 2/2011 | Ryu et al. ...................... 345/173 |
| 2011/0141051 A1* | 6/2011 | Ryu .............................. 345/173 |

FOREIGN PATENT DOCUMENTS

CN 201247457 Y 5/2009

\* cited by examiner

*Primary Examiner* — Van Chow
(74) *Attorney, Agent, or Firm* — Li & Cai Intellectual Property (USA) Office

(57) ABSTRACT

A positioning method and a driving apparatus of a touch panel are provided. The touch panel includes a conductive layer with anisotropic conductivity, a plurality of first electrodes and a plurality of second electrodes. The first electrodes and the second electrodes are respectively disposed on a first side and a second side of the conductive layer. The first electrodes and the second electrodes are sensed to obtain a plurality of sensing values. A first relative extreme portion at least having a relative extreme is defined among the first electrodes. A second relative extreme portion at least having a relative extreme is defined among the second electrodes. A ratio of sensing values is calculated according to the first relative extreme portion and the second relative extreme portion. A position of a touch point on the touch panel in a first axial direction is calculated with the ratio of sensing values.

20 Claims, 9 Drawing Sheets

POSITIONING METHOD AND DRIVING APPARATUS OF TOUCH PANEL

BACKGROUND

1. Field of the Disclosure

The present disclosure generally relates to a touch panel, in particular, to a positioning method and a driving apparatus of a touch panel.

2. Description of Related Art

To achieve the higher portability, smaller volume and more humane design, lots of information products adopt an input method of a touch panel to replace the conventional keyboard and mouse. The touch panel may be assembled on many sorts of flat panel displays and provide the flat panel display with both the image display and operation information input functions. The conventional touch panel mainly includes resistive, capacitive, infrared and surface acoustic wave types. Different types of touch panels have varying benefits and drawbacks, for example, the capacitive touch panel exhibits vivid images and only needs a small touch force but the price is quite high. Therefore, it has always been a subject in this field to reduce the cost of the touch panel and accurately position a touch point.

SUMMARY OF THE DISCLOSURE

Accordingly, the present disclosure is directed to a positioning method and a driving apparatus of a touch panel, which are applicable to different types of touch panels and accurate positioning of a touch point.

In an embodiment of the present disclosure, a positioning method of a touch panel is provided. The touch panel includes a conductive layer with anisotropic conductivity and a plurality of electrode pairs. Each of the electrode pairs includes a first electrode and a second electrode. Two opposite sides of the conductive layer along a first axial direction are respectively a first side and a second side. The first electrodes are disposed on the first side of the conductive layer, and the second electrodes are disposed on the second side of the conductive layer. The positioning method includes the following steps. A plurality of first electrodes and a plurality of second electrodes are sensed to obtain a plurality of sensing values. A first relative extreme portion is defined among the sensing values of the first electrodes, in which the first relative extreme portion having at least one first relative extreme in the sensing values of the first electrodes. A second relative extreme portion is defined among the sensing values of the second electrodes, in which the second relative extreme portion having at least one second relative extreme in the sensing values of the second electrode. A ratio of sensing values is calculated according to the first relative extreme portion and the second relative extreme portion. A position of a touch point on the touch panel in the first axial direction is calculated with the ratio of sensing values.

In an embodiment of the present disclosure, a driving apparatus of a touch panel is provided. The touch panel includes a conductive layer with anisotropic conductivity. Two opposite sides of the conductive layer along a first axial direction are respectively a first side and a second side. The driving apparatus includes a plurality of electrode pairs, a selector, a sensing circuit and a microcontroller. Each of the electrode pairs includes a first electrode and a second electrode. The first electrodes are disposed on the first side of the conductive layer. The second electrodes are disposed on the second side of the conductive layer. The selector is connected to the first electrodes and the second electrodes of the conductive layer. The sensing circuit is connected to the selector. The sensing circuit drives and senses the first electrodes and the second electrodes through the selector to obtain a plurality of sensing values. The microcontroller is connected to the sensing circuit to receive the sensing values. A first relative extreme portion is defined among the sensing values of the first electrodes and the first relative extreme portion having at least one first relative extreme in the sensing values of the first electrodes. A second relative extreme portion is defined among the sensing values of the second electrodes and the second relative extreme portion having at least one second relative extreme in the sensing values of the second electrodes. The microcontroller calculates a ratio of sensing values according to the first relative extreme portion and the second relative extreme portion. Then, the microcontroller calculates a position of a touch point on the touch panel in the first axial direction by the ratio of sensing values.

In an embodiment of the present disclosure, the step of calculating the position of the touch point in the first axial direction includes: if the sensing value of the first relative extreme portion is smaller than the sensing value of the second relative extreme portion, the position of the touch point on the touch panel in the first axial direction $y = L \div (2r)$, where $L$ is a distance from the first electrodes to the second electrodes and $r$ is the ratio of sensing values; if the sensing value of the first relative extreme portion is equal to the sensing value of the second relative extreme portion, $y = L \div 2$; and if the sensing value of the first relative extreme portion is greater than the sensing value of the second relative extreme portion, $y = L - (L \times r) \div 2$.

In order to make the aforementioned features and advantages of the present disclosure comprehensible, embodiments are described in detail below with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1A:
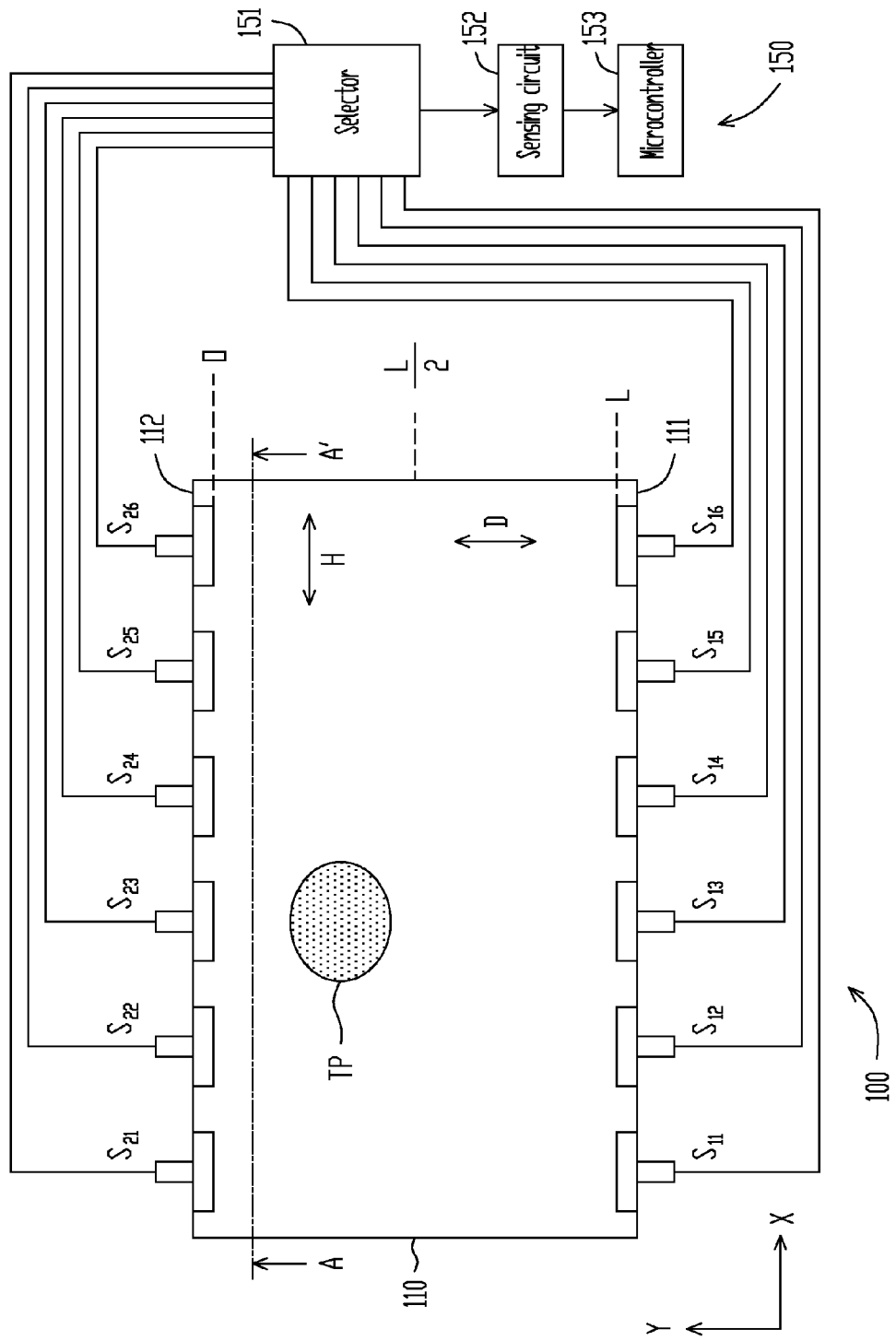
FIG. 1A is a schematic view illustrating a surface capacitive touch panel according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
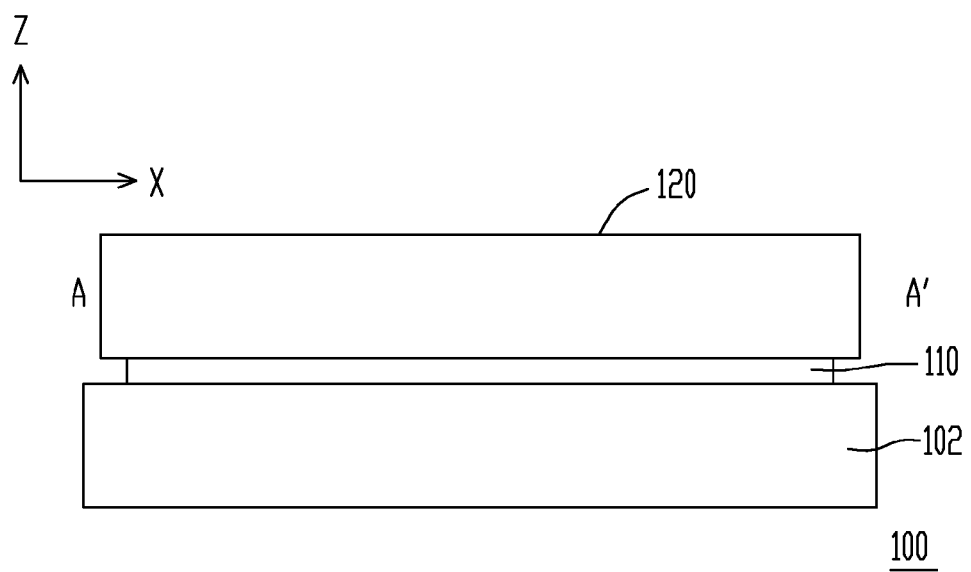
FIG. 1B is a schematic partial cross-sectional view of the touch panel in FIG. 1A taken along a section line A-A'.

FIG. 1A is a schematic view illustrating a capacitive touch panel 100 and a driving apparatus 150 according to an embodiment of the present disclosure. FIG. 1B is a schematic partial cross-sectional view of the touch panel 100 in FIG. 1A taken along a section line A-A'. A Cartesian coordinate system is introduced in FIG. 1A and FIG. 1B, which includes an X-axis direction, a Y-axis direction and a Z-axis direction perpendicular to one another. The touch panel 100 includes a conductive layer 110, a cover lens 120 and a substrate 102. The conductive layer 110 is disposed on the substrate 102 and the cover lens 120 is disposed on the conductive layer 110. The conductive layer 110 has anisotropic conductivity, that is, the conductive film 110 has different impedance properties in two different directions. For example, the conductive layer 110 has a low impedance direction D and a high impedance direction H shown in FIG. 1A, in which the low impedance direction D and the high impedance direction H may be perpendicular. In this embodiment, the low impedance direction D of the conductive layer 110 is the Y-axis direction.

In this embodiment, the substrate 102 and/or the cover lens 120 may be made of a transparent material such as polyethylene (PE), polycarbonate (PC), polyethylene terephthalate (PET), polymethyl methacrylate (PMMA) or a thinned glass substrate. The conductive layer 110 may be a conductive film formed by carbon nano-tubes (CNTs) arranged in parallel. The CNT film is made by stretching a super vertical-aligned carbon nanotube array and is applicable to fabricating transparent conductive films. For example, a CNT layer is formed on a silicon substrate, a quartz substrate or other suitable substrates by chemical vapor deposition (CVD) or other suitable methods. Then, a CNT film, i.e., the conductive layer 110, is stretched out from one side of the CNT layer along a stretching direction. Afterwards, the conductive layer 110 is disposed on the substrate 102 and meanwhile, the cover lens 120 is covered on the conductive layer 110, thus preliminarily finishing the capacitive touch panel 100. As the long chain CNTs are approximately arranged in parallel along the stretching direction in the stretching process, the CNT film has a low impedance in the stretching direction, and an impedance in the direction perpendicular to the stretching direction is about 50 to 350 times of the impedance in the stretching direction. A surface resistance of the CNT film ranges from 1 KΩ to 800 KΩ due to different measurement positions and directions. Therefore, the conductive layer 110 has anisotropic conductivity.

Referring to FIG. 1A, the low impedance direction D of the conductive layer 110 is a first axial direction, and two opposite sides of the conductive layer 110 along the first axial direction (for example, the Y-axis direction) are respectively a first side 111 and a second side 112. First electrodes $S_{11}$, $S_{12}$, $S_{13}$, $S_{14}$, $S_{15}$, and $S_{16}$ are disposed on the first side 111 of the conductive layer 110. Second electrodes $S_{21}$, $S_{22}$, $S_{23}$, $S_{24}$, $S_{25}$, and $S_{26}$ are disposed on the second side 112 of the conductive layer 110. Although six first electrodes $S_{11}$ to $S_{16}$ and six second electrodes $S_{21}$ to $S_{26}$ are illustrated in FIG. 1A respectively, in practical applications, the number of the first electrodes and the second electrodes may be determined according to the actual area and design requirements of the touch panel.

For simplicity, only one touch point TP is illustrated when the touch panel 100 is operated in the following embodiments. In practical operations, the positioning method of this embodiment is also applicable to multiple touch points TP.

Referring to FIG. 1A, the driving apparatus 150 includes a selector 151, a sensing circuit 152 and a microcontroller 153. The selector 151 is connected to the electrodes $S_{11}$ to $S_{16}$ and $S_{21}$ to $S_{26}$ of the conductive layer 110. The selector 151 selects an electrode one by one according to the abovementioned sequence and provides a reference voltage (for example, a grounding voltage or other fixed level reference voltages) to other electrodes that are not selected. The sensing circuit 152 is connected between the selector 151 and the microcontroller 153. When one of the electrodes $S_{11}$ to $S_{16}$ and $S_{21}$ to $S_{26}$ is selected, the sensing circuit 152 drives and senses the selected electrode through the selector 151. Therefore, the sensing circuit 152 may drive and sense the first electrodes $S_{11}$ to $S_{16}$ and the second electrodes $S_{21}$ to $S_{26}$ through the selector 151 to obtain a plurality of sensing values.

Figure 2:
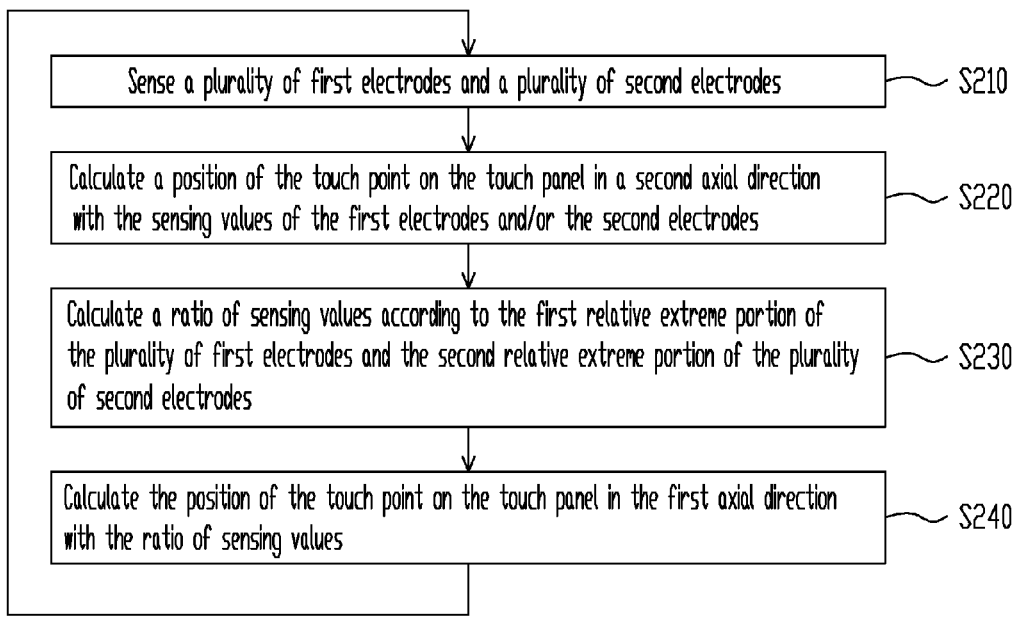
FIG. 2 illustrates a positioning method of a touch panel according to an embodiment of the present disclosure.

FIG. 2 illustrates a positioning method of a touch panel according to an embodiment of the present disclosure. In step S210, the sensing circuit 152 senses the first electrodes $S_{11}$ to $S_{16}$ and the second electrodes $S_{21}$ to $S_{26}$ through the selector 151 to obtain a plurality of sensing values and transfers the sensing values to the microcontroller 153. The sensing method (driving method) of the touch panel 100 is, for example, selecting the first electrodes $S_{11}$ to $S_{16}$ and the second electrodes $S_{21}$ to $S_{26}$ one by one to scan and sense. In this embodiment, the first electrodes $S_{11}$ to $S_{16}$ and the second electrodes $S_{21}$ to $S_{26}$ are scanned and driven along the X-axis direction. For example, the scanning, driving and sensing sequence of the electrodes may be $S_{11}$, $S_{12}$, $S_{13}$, $S_{14}$, $S_{15}$, $S_{16}$, $S_{26}$, $S_{25}$, $S_{24}$, $S_{23}$, $S_{22}$, $S_{21}$, or $S_{11}$, $S_{12}$, $S_{13}$, $S_{14}$, $S_{15}$, $S_{16}$, $S_{21}$, $S_{22}$, $S_{23}$, $S_{24}$, $S_{25}$, $S_{26}$, or other sequences (for example, a random sequence), which is not limited herein. The scanning, driving and sensing operations include, for example, applying a driving voltage (for example, a power supply voltage VDD) to the selected electrode to charge the conductive layer 110 and then sensing a physical characteristic value (i.e., a sensing value such as a voltage value, quantity of electric charge or a capacitance value) of the selected electrode. When one electrode is scanned and sensed, other electrodes are all applied with a reference voltage (for example, a grounding voltage).

In another embodiment, when one selected electrode is scanned, driven and sensed, except that the electrode relative to the selected electrode is floating, other electrodes are all applied with the reference voltage (for example, the grounding voltage). For example, when the first electrode $S_{13}$ is scanned and sensed, except that the second electrode $S_{23}$ relative to the first electrode $S_{13}$ is floating, other electrodes $S_{11}$ to $S_{12}$, $S_{14}$ to $S_{16}$, $S_{21}$ to $S_{22}$, and $S_{24}$ to $S_{26}$ are all applied with the grounding voltage. For another example, when the second electrode $S_{25}$ is scanned and sensed, except that the first electrode $S_{15}$ relative to the second electrode $S_{25}$ is floating, other electrodes $S_{11}$ to $S_{14}$, $S_{16}$, $S_{21}$ to $S_{24}$, and $S_{26}$ are all applied with the grounding voltage.

When a finger or an object touches the touch panel 100 or approaches the conductive layer 110 (i.e., the touch point TP shown in FIG. 1A), the sensing circuit 152 performs step S210 to drive and sense the first electrodes $S_{11}$ to $S_{16}$ and the second electrodes $S_{21}$ to $S_{26}$ through the selector 151 and transfer a plurality of obtained sensing values to the microcontroller 153. In the following step, the microcontroller 153 may calculate X-axis and Y-axis positions according to the sensing values of the first electrodes $S_{11}$ to $S_{16}$ and the sensing values of the second electrodes $S_{21}$ to $S_{26}$.

After step S210 is finished, the microcontroller 153 acquires the position of the relative extreme of the first electrodes $S_{11}$ to $S_{16}$ and/or the second electrodes $S_{21}$ to $S_{26}$. In this embodiment, when the microcontroller 153 finds that the relative extreme occurs at an electrode pair (for example, the first electrode $S_{13}$ and the second electrode $S_{23}$) in the low impedance direction D, the microcontroller 153 may perform step S220. In step S220, the microcontroller 153 calculates a position of the touch point TP on the touch panel 100 in a second axial direction (for example, the X-axis direction) with the sensing values of the first electrodes $S_{11}$ to $S_{16}$ and/or the sensing values of the second electrodes $S_{21}$ to $S_{26}$.

Figure 3A:
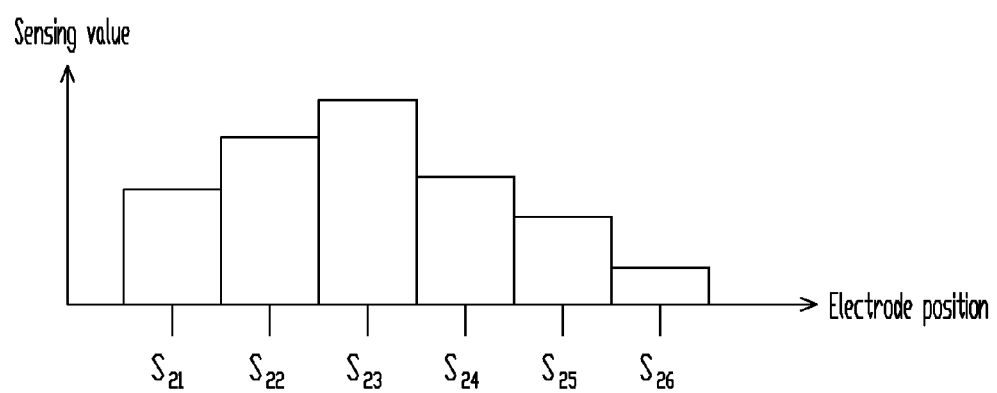
FIG. 3A is a schematic view illustrating sensing values of second electrodes S21 to S26 in FIG. 1A according to an embodiment of the present disclosure.
Figure 3B:
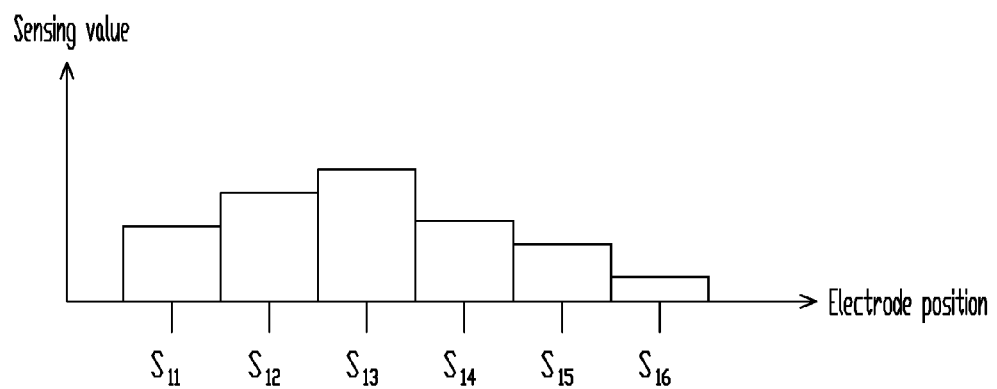
FIG. 3B is a schematic view illustrating sensing values of first electrodes $S_{11}$ to $S_{16}$ in FIG. 1A according to an embodiment of the present disclosure.

FIG. 3A is a schematic view illustrating the sensing values of the second electrodes $S_{21}$ to $S_{26}$ in FIG. 1A according to an embodiment of the present disclosure. The horizontal axis represents positions of the second electrodes $S_{21}$ to $S_{26}$ and the vertical axis represents the sensing values. As the touch point TP is close to the second electrode $S_{23}$, a relative extreme occurs at $S_{23}$ in FIG. 3A, for example, the sensing value of the second electrode $S_{23}$ is greater than the sensing values of the adjacent second electrodes. Similarly, FIG. 3B is a schematic view illustrating the sensing values of the first electrodes $S_{11}$ to $S_{16}$ in FIG. 1A according to an embodiment of the present disclosure. The horizontal axis represents positions of the first electrodes $S_{11}$ to $S_{16}$ and the vertical axis represents the sensing values. A relative extreme also occurs at $S_{13}$ in FIG. 3B. As the distance between the touch point TP and the first electrodes $S_{11}$ to $S_{16}$ is greater than the distance between the touch point TP and the second electrodes $S_{21}$ to $S_{26}$, the sensing values of the first electrodes $S_{11}$ to $S_{16}$ are smaller than the sensing values of the second electrodes $S_{21}$ to $S_{26}$ on the whole. In some embodiments, in step S220, the position of the touch point TP on the touch panel 100 in the X-axis direction may be calculated according to the position where the relative extreme occurs in the sensing values of the first electrodes $S_{11}$ to $S_{16}$ (herein, the position of the first electrode $S_{13}$). Or, in step S220, the position of the touch point TP on the touch panel 100 in the X-axis direction may also be calculated according to the position where the relative extreme occurs in the sensing values of the second electrodes $S_{21}$ to $S_{26}$ (herein, the position of the second electrode $S_{23}$).

Figure 3C:
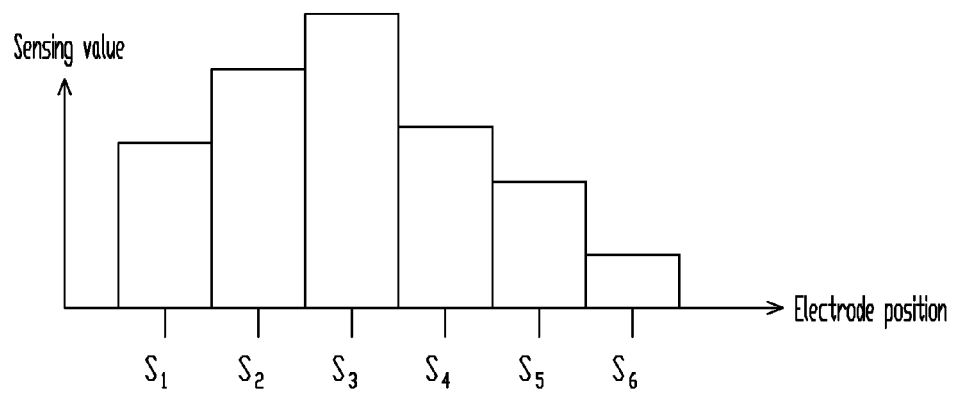
FIG. 3C is a schematic view illustrating adding the sensing value of each of the first electrodes $S_{11}$ to $S_{16}$ and the sensing value of the corresponding one of the second electrodes $S_{21}$ to $S_{26}$ in FIG. 1A according to an embodiment of the present disclosure.

In this embodiment, in step S220, the sensing value of each of the first electrodes $S_{11}$ to $S_{16}$ and the sensing value of the corresponding one of the second electrodes $S_{21}$ to $S_{26}$ are added to obtain second axial direction sensing values $S_1$, $S_2$, $S_3$, $S_4$, $S_5$, and $S_6$. For example, $S_1 = S_{11} + S_{21}$, $S_2 = S_{12} + S_{22}$, and so forth. FIG. 3C is a schematic view illustrating adding the sensing value of each of the first electrodes $S_{11}$ to $S_{16}$ and the sensing value of the corresponding one of the second electrodes $S_{21}$ to $S26$ in FIG. 1A according to an embodiment of the present disclosure. The horizontal axis represents positions of the electrodes (for example, the X-axis position) and the vertical axis represents the sensing values. Then, in step S220, the position of the relative extreme in the second axial direction sensing values $S_1$ to $S_6$ (herein, the position of the second axial sensing value $S_3$) is used as the position of the touch point TP on the touch panel 100 in the second axial direction (for example, the X-axis direction).

Figure 3D:
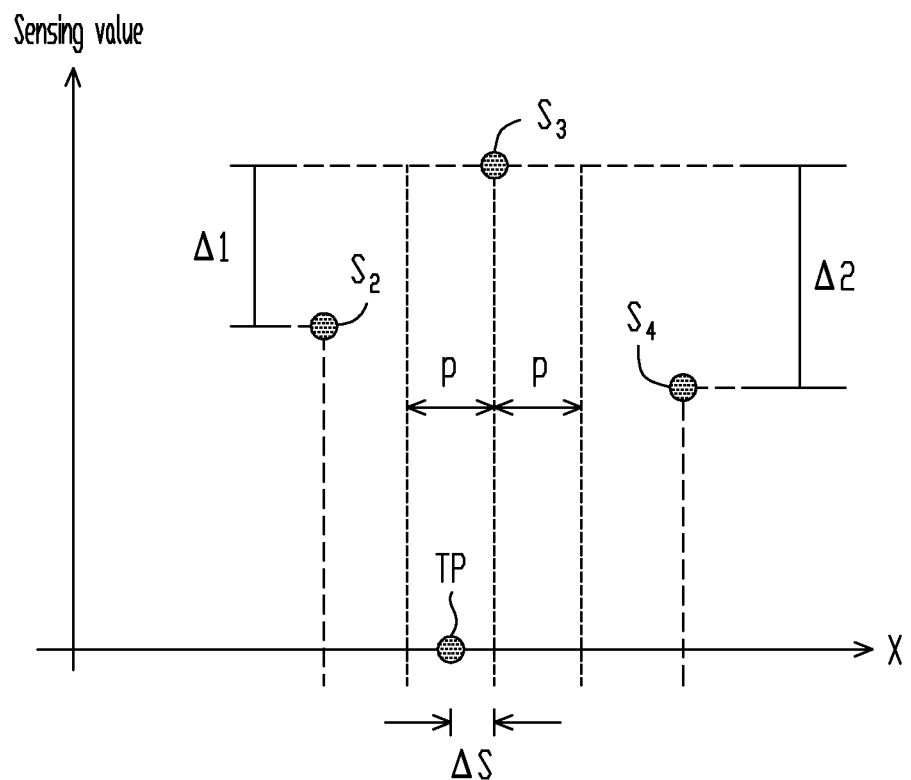
FIG. 3D is a schematic view illustrating using interpolation to obtain a position in a second axial direction according to an embodiment of the present disclosure.

In the application of this embodiment, interpolation or other algorithms may also be adopted to calculate a more accurate position in the second axial direction according to the design requirements. FIG. 3D is a schematic view illustrating step S220 of using interpolation to obtain the position in the second axial direction according to an embodiment of the present disclosure. The horizontal axis represents positions in the X-axis direction and the vertical axis represents the sensing values. FIG. 3D only shows the second axial direction sensing values $S_2$, $S_3$, and $S_4$ and omits other sensing values. According to the relative extreme (herein, $S_3$) in the second axial direction sensing values $S_1$ to $S_6$ and two sensing values (herein, $S_2$ and $S_4$) adjoining the relative extreme respectively of the second axial direction sensing values $S_1$ to $S_6$, in step S220, the position of the touch point TP on the touch panel 100 in the second axial direction is calculated by interpolation. It is assumed that the difference between the sensing value $S_3$ and the sensing value $S_2$ is $\Delta 1$, the difference between the sensing value $S_3$ and the sensing value $S_4$ is $\Delta 2$, and a half of the distance between the two adjacent electrodes (for example, the electrode $S_{13}$ and $S_{14}$) is p. If $\Delta 1 > \Delta 2$, the offset of the touch point TP to the position of the relative extreme (for example, the position of the sensing value $S_3$) $\Delta S = [p(\Delta 1 - \Delta 2)] \div \Delta 1$. If $\Delta 1 < \Delta 2$, the offset of the touch point TP to the position of the relative extreme (i.e., the position of the sensing values $S_3$) $\Delta S = [-p(\Delta 2 - \Delta 1)] \div \Delta 2$. Therefore, the position of the touch point TP in the second axial direction is the position of the relative extreme plus the offset $\Delta S$, for example, the position of the sensing value $S_3$ plus the offset $\Delta S$.

Referring to FIG. 1A and FIG. 2, after steps S210 and S220 are finished, the microcontroller 153 acquires the position of the relative extreme of the first electrodes $S_{11}$ to $S_{16}$ and/or the second electrodes $S_{21}$ to $S_{26}$. In this embodiment, when the microcontroller 153 finds that the relative extreme occurs at the electrode pair (for example, the first electrode $S_{13}$ and the second electrode $S_{23}$) in the low impedance direction D at the same time, the microcontroller 153 may perform steps S230 and S240. In other embodiments, as long as the relative extreme occurs at one electrode in the electrode pairs in the low impedance direction D, the microcontroller 153 may perform steps S230 and S240.

In step S230, the microcontroller 153 defines a first relative extreme portion among the sensing values of the first electrodes $S_{11}$ to $S_{16}$ and defines a second relative extreme portion among the sensing values of the second electrodes $S_{21}$ to $S_{26}$. The first relative extreme portion at least has a first relative extreme in the sensing values of the first electrodes $S_{11}$ to $S_{16}$ (for example, the sensing value of the first electrode $S_{13}$ in FIG. 3B) and the second relative extreme portion at least has a second relative extreme in the sensing values of the second electrodes $S_{21}$ to $S_{26}$ (for example, the sensing value of the second electrode $S_{23}$ in FIG. 3A). The number of the electrodes of the first relative extreme portion and the second relative extreme portion may be decided flexibly according to the design requirements. Here, for example, a single electrode is employed to define the first relative extreme portion and the second relative extreme portion. In other following embodiments, two electrodes (or more electrodes) may be employed to define the first relative extreme portion and the second relative extreme portion.

In this embodiment, the microcontroller 153 finds that the relative extreme occurs at the first electrode $S_{13}$ and the second electrode $S_{23}$ at the same time, so in step S230, the microcontroller 153 defines the sensing value of the first electrode $S_{13}$ to be the first relative extreme portion and defines the sensing value of the second electrode $S_{23}$ to be the second relative extreme portion. Then, in step S230, the microcontroller 153 calculates a ratio of sensing values according to the first relative extreme portion and the second relative extreme portion, that is, calculates a ratio of the second relative extreme to the first relative extreme to serve as the ratio of sensing values. For example, it is assumed that the sensing value of the first electrode $S_{13}$ is A and the sensing value of the second electrode $S_{23}$ is B, in step S230, a ratio of sensing values r=B/A.

In step S240, the microcontroller 153 calculates the position of the touch point TP on the touch panel 100 in the first axial direction (for example, the Y-axis direction) with the ratio of sensing values r. For example, if the sensing value of the first relative extreme portion (herein, the sensing value of the first electrode $S_{13}$) is smaller than the sensing value of the second relative extreme portion (herein, the sensing value of the second electrode $S_{23}$), the position of the touch point TP on the touch panel in the first axial direction y=L÷(2r), where L is a distance from the first electrodes $S_{11}$ to $S_{16}$ to the second electrodes $S_{21}$ to $S_{26}$ and r is the ratio of sensing values obtained in step S230. If the sensing value of the first relative extreme portion is equal to the sensing value of the second relative extreme portion, y=L÷2. If the sensing value of the first relative extreme portion is greater than the sensing value of the second relative extreme portion, y=L−(L×r)÷2. If the sensing value of the first relative extreme portion is far smaller than the sensing value of the second relative extreme portion, y=0. If the sensing value of the first relative extreme portion is far greater than the sensing value of the second relative extreme portion, y=L.

Figure 4A:
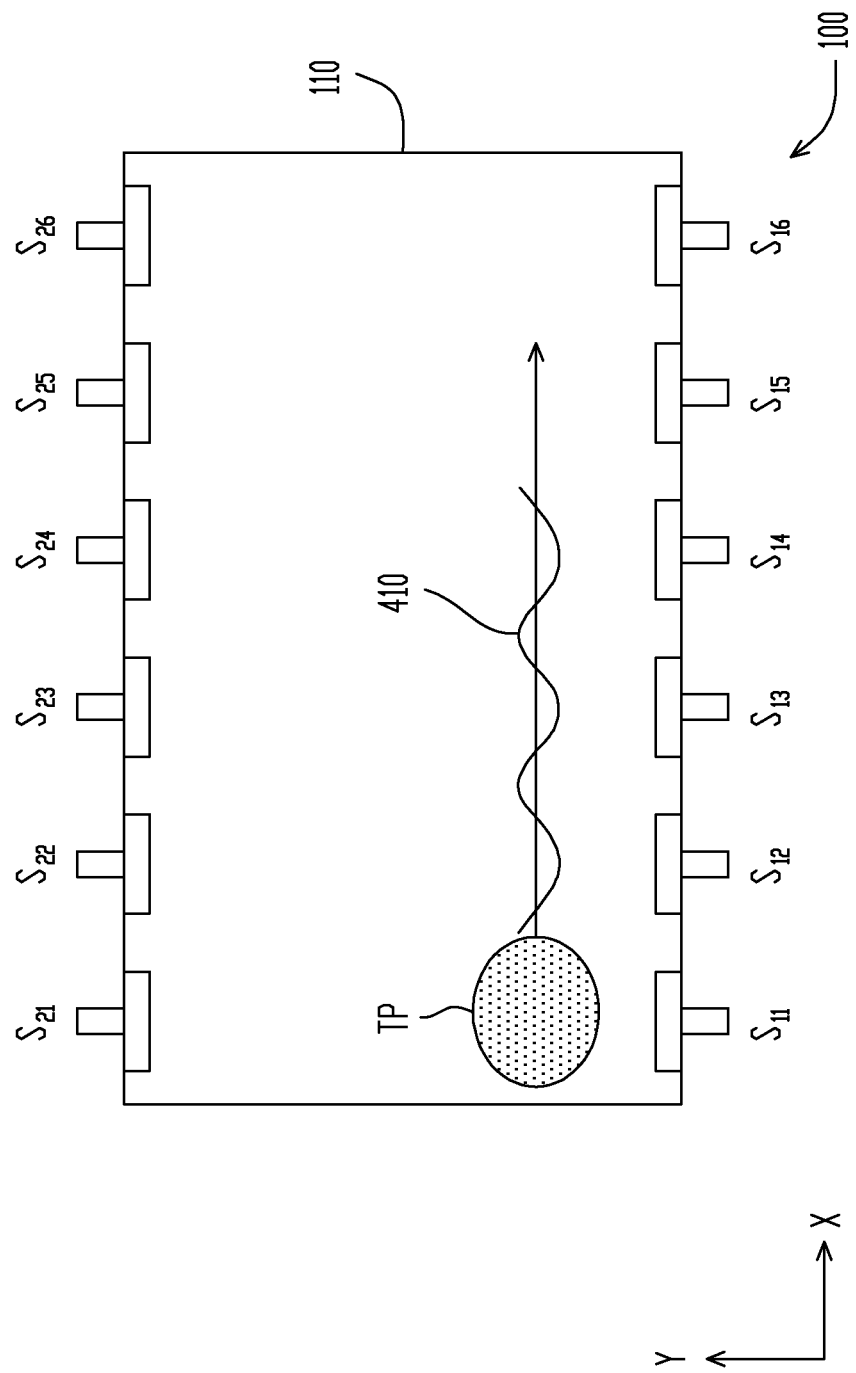
FIG. 4A illustrates a touch point TP moving on the touch panel along the second axial direction.
Figure 4B:
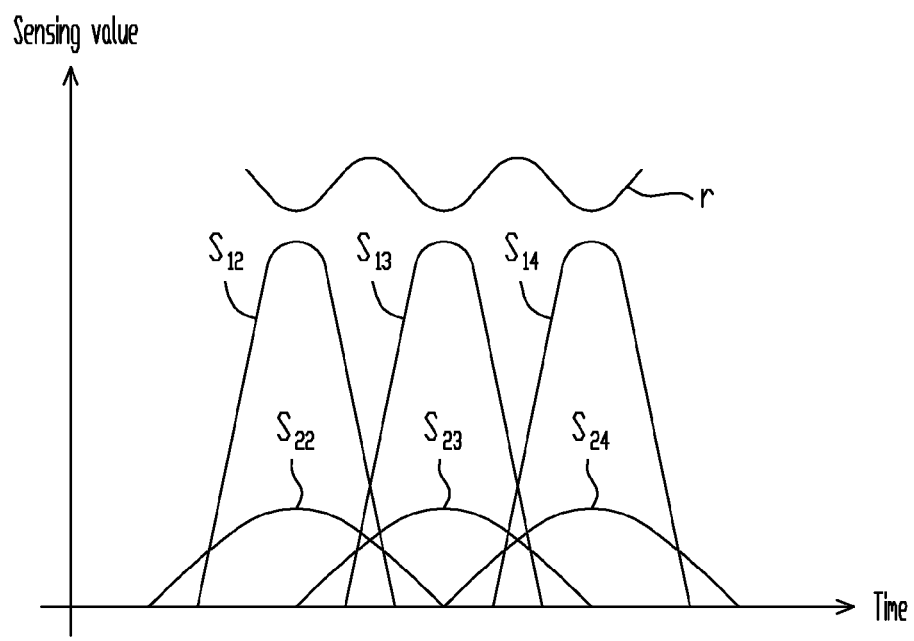
FIG. 4B illustrates changes of the sensing values of all the electrodes when the touch point TP moves on the touch panel along the second axial direction.

FIG. 4A illustrates the touch point TP moving on the touch panel 100 along the second axial direction. It is assumed that the touch point TP moves in a straight line from left to right on a lower edge of the touch panel 100 as shown in FIG. 4A. FIG. 4B illustrates changes of the sensing values of all the electrodes when the touch point TP moves on the touch panel 100 along the second axial direction. The horizontal axis represents the time and the vertical axis represents the sensing values. FIG. 4B only shows the sensing values of the first electrodes $S_{12}$, $S_{13}$, and $S_{14}$ and the sensing values of the second electrodes $S_{22}$, $S_{23}$, and $S_{24}$ for exemplary purpose and omits other sensing values. Referring to FIG. 4A and FIG. 4B, in the course that the touch point TP moves in a straight line, the changes of the sensing values of the electrodes $S_{12}$, $S_{13}$, $S_{14}$, $S_{22}$, $S_{23}$, and $S_{24}$ and the ratio of sensing values r are shown in FIG. 4B. Therefore, the moving path of the touch point TP calculated by the positioning method in FIG. 2 is the same as the moving path 410 of FIG. 4A. To improve the phenomenon in FIG. 4A, in the following embodiments, two or more electrodes are employed to define the first relative extreme portion and the second relative extreme portion.

In this embodiment, two adjacent electrodes are employed to define the first relative extreme portion and the second relative extreme portion. After step S210 is finished each time, the position of the relative extreme of the first electrodes $S_{11}$ to $S_{16}$ and/or the second electrodes $S_{21}$ to $S_{26}$ is acquired and further the position of the touch point TP in the second axial direction is preliminarily determined. In this embodiment, when the position of the touch point TP in the second axial direction falls between two adjacent electrodes among the first electrodes $S_{11}$ to $S_{16}$, the sensing values of the two adjacent electrodes are defined to be the first relative extreme portion in step S230. The sum of the plurality of sensing values of the first relative extreme portion is calculated to obtain a first total sum value. Similarly, when the position of the touch point TP in the second axial direction falls between two adjacent electrodes among the second electrodes $S_{21}$ to $S_{26}$, the sensing values of the two adjacent electrodes are defined to be the second relative extreme portion in step S230. The sum of the plurality of sensing values of the second relative extreme portion is calculated to obtain a second total sum value. Then, the ratio of the second total sum value to the first total sum value is calculated in step S230 to serve as the ratio of sensing values r.

For example, if the position of the touch point TP in the second axial direction is sensed between the first electrodes $S_{12}$ and $S_{13}$ in step S210, the sensing values of the two adjacent electrodes $S_{12}$ and $S_{13}$ are defined to be the first relative extreme portion, and then the sum of all the sensing values of the first relative extreme portion is calculated to obtain the first total sum value ($S_{12}+S_{13}$) in step S230. Similarly, if the position of the touch point TP in the second axial direction falls between the second electrodes $S_{22}$ and $S_{23}$, the sensing values of the two adjacent electrodes $S_{22}$ and $S_{23}$ are defined to be the second relative extreme portion, and then the sum of all the sensing values of the second relative extreme portion is calculated to obtain the second total sum value ($S_{22}+S_{23}$) in step S230. Then, in step S230, the ratio of the second total sum value to the first total sum value is calculated, for example, r=($S_{22}+S_{23}$)÷($S_{12}+S_{13}$).

In the following embodiments, three adjacent electrodes are employed to define the first relative extreme portion and the second relative extreme portion. After step S210 is finished each time, the position of the relative extreme of the first electrodes $S_{11}$ to $S_{16}$ and/or the second electrodes $S_{21}$ to $S_{26}$ is acquired. In this embodiment, in step S230, the sensing value of the electrode where the relative extreme occurs and the sensing values of two electrodes adjacent respectively to the electrode where the relative extreme occurs among the first electrodes $S_{11}$ to $S_{16}$ are defined to be the first relative extreme portion, and then the sum of all the sensing values of the first relative extreme portion is calculated to obtain the first total sum value. Similarly, in step S230, the sensing value of the electrode where the relative extreme occurs and the sensing values of two electrodes adjacent respectively to the electrode where the relative extreme occurs among the second electrodes $S_{21}$ to $S_{26}$ are defined to be the second relative extreme portion, and then the sum of all the sensing values of the second relative extreme portion is calculated to obtain the second total sum value. Then, in step S230, the ratio of the second total sum value to the first total sum is calculated to serve as the ratio of sensing values r.

For example, it is assumed that step S210 senses the relative extreme occurs at the electrode $S_{13}$ among the first electrodes $S_{11}$ to $S_{16}$ and the relative extreme occurs at the electrode $S_{23}$ among the second electrodes $S_{21}$ to $S_{26}$. Therefore, in step S230, the sensing values of the three adjacent electrodes $S_{12}$, $S_{13}$ and $S_{14}$ are defined to be the first relative extreme portion, and then the sum of all the sensing values of the first relative extreme portion is calculated to obtain the first total sum value ($S_{12}+S_{13}+S_{14}$). Similarly, in step S230, the sensing values of the three adjacent electrodes $S_{22}$, $S_{23}$ and $S_{24}$ are defined to be the second relative extreme portion, and then the sum of all the sensing values of the second relative extreme portion is calculated to obtain the second total sum value ($S_{22}+S_{23}+S_{24}$). Then, in step S230, the ratio of the second total sum value to the first total sum value is calculated, for example, r=($S_{22}+S_{23}+S_{24}$) ($S_{12}+S_{13}+S_{14}$).

The number of the electrodes of the first relative extreme portion and second relative extreme portion may be decided flexibly according to the design requirements. In other embodiments, in step S230, an average of the plurality of sensing values of the first relative extreme portion may be calculated to obtain a first average value, and in addition, an average of the plurality of sensing values of the second relative extreme portion may be calculated to obtain a second average value, and then the ratio of the second average value to the first average value is calculated to serve as the ratio of sensing values r.

In view of the above, the various positioning methods disclosed in the above embodiments are all applicable to different types of touch panels and accurate positioning of a touch point TP. For example, the positioning method is also applicable to a resistive touch panel with two conductive films. One of the two conductive films may be the conductive layer 110 in FIG. 1A and the other may be an indium tin oxide (ITO) film fixedly coupled to the reference voltage. The two conductive films are overlaid on the substrate. A plurality of insulating spacers is uniformly distributed between the two conductive films, so that a fixed distance is kept between the two conductive films.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A positioning method of a touch panel, wherein the touch panel comprises a conductive layer with anisotropic conductivity and a plurality of electrode pairs, each of the electrode pairs comprises a first electrode and a second electrode, two opposite sides of the conductive layer along a first axial direction are respectively a first side and a second side, the first electrodes are disposed on the first side of the conductive layer, and the second electrodes are disposed on the second side of the conductive layer, the positioning method comprising:
   sensing the first electrodes and the second electrodes to obtain a plurality of sensing values;
   defining a first relative extreme portion among the sensing values of the first electrodes, wherein the first relative extreme portion having at least one first relative extreme in the sensing values of the first electrodes;
   defining a second relative extreme portion among the sensing values of the second electrodes, wherein the second relative extreme portion having at least one second relative extreme in the sensing values of the second electrodes;
   calculating a ratio of sensing values according to the first relative extreme portion and the second relative extreme portion; and
   calculating a position of a touch point on the touch panel in the first axial direction by the ratio of sensing values.

2. The positioning method of a touch panel according to claim 1, wherein the step of calculating the ratio of sensing values comprises:
   calculating a ratio of the second relative extreme to the first relative extreme to serve as the ratio of sensing values.

3. The positioning method of a touch panel according to claim 1, wherein the step of calculating the ratio of sensing values comprises:
   calculating a sum of a plurality of sensing values of the first relative extreme portion to obtain a first total sum value;
   calculating a sum of a plurality of sensing values of the second relative extreme portion to obtain a second total sum value; and
   calculating a ratio of the second total sum value to the first total sum value to serve as the ratio of sensing values.

4. The positioning method of a touch panel according to claim 1, wherein the step of calculating the ratio of sensing values comprises:
   calculating an average of a plurality of sensing values of the first relative extreme portion to obtain a first average value;
   calculating an average of a plurality of sensing values of the second relative extreme portion to obtain a second average value; and
   calculating a ratio of the second average value to the first average value to serve as the ratio of sensing values.

5. The positioning method of a touch panel according to claim 1, wherein the step of calculating the position of the touch point on the touch panel in the first axial direction comprises:
   if the sensing value of the first relative extreme portion is smaller than the sensing value of the second relative extreme portion, the position of the touch point on the touch panel in the first axial direction $y=L \div (2r)$, where L is a distance from the first electrodes to the second electrodes and r is the ratio of sensing values;
   if the sensing value of the first relative extreme portion is equal to the sensing value of the second relative extreme portion, $y=L \div 2$; and
   if the sensing value of the first relative extreme portion is greater than the sensing value of the second relative extreme portion, $y=L-(L \times r) \div 2$.

6. The positioning method of a touch panel according to claim 5, wherein the step of calculating the position of the touch point on the touch panel in the first axial direction further comprises:
   if the sensing value of the first relative extreme portion is far smaller than the sensing value of the second relative extreme portion, $y=0$; and
   if the sensing value of the first relative extreme portion is far greater than the sensing value of the second relative extreme portion, $y=L$.

7. The positioning method of a touch panel according to claim 1, further comprising:
   adding the sensing value of each of the first electrodes and the sensing value of the corresponding one of the second electrodes to obtain a plurality of second axial direction sensing values; and
   using a position of a relative extreme in the second axial direction sensing values to serve as a position of the touch point on the touch panel in a second axial direction.

8. The positioning method of a touch panel according to claim 1, further comprising:
   adding the sensing value of each of the first electrodes and the sensing value of the corresponding one of the second electrodes to obtain a plurality of second axial direction sensing values; and
   calculating a position of the touch point on the touch panel in a second axial direction by interpolation according to a relative extreme in the second axial direction sensing values and two sensing values adjoining the relative extreme respectively of the second axial direction sensing values, wherein the first axial direction and the second axial direction are perpendicular to each other.

9. The positioning method of a touch panel according to claim 1, wherein a low impedance direction of the conductive layer is the first axial direction.

10. The positioning method of a touch panel according to claim 1, wherein the conductive layer is a conductive film formed by carbon nano-tubes arranged in parallel.

11. A driving apparatus of a touch panel, wherein the touch panel comprises a conductive layer with anisotropic conductivity, and two opposite sides of the conductive layer along a first axial direction are respectively a first side and a second side, the driving apparatus comprising:
- a plurality of electrode pairs, wherein each of the electrode pairs comprises a first electrode and a second electrode, the first electrodes are disposed on the first side of the conductive layer, and the second electrodes are disposed on the second side of the conductive layer;
- a selector, connected to the first electrodes and the second electrodes of the conductive layer;
- a sensing circuit, connected to the selector, wherein the sensing circuit drives and senses the first electrodes and the second electrodes through the selector to obtain a plurality of sensing values; and
- a microcontroller, connected to the sensing circuit to receive the sensing values, wherein a first relative extreme portion is defined among the sensing values of the first electrodes and the first relative extreme portion having at least one first relative extreme in the sensing values of the first electrodes; a second relative extreme portion is defined among the sensing values of the second electrodes and the second relative extreme portion having at least one second relative extreme in the sensing values of the second electrodes; the microcontroller calculates a ratio of sensing values according to the first relative extreme portion and the second relative extreme portion; and the microcontroller calculates a position of a touch point on the touch panel in the first axial direction by the ratio of sensing values.

12. The driving apparatus of a touch panel according to claim 11, wherein the microcontroller calculates a ratio of the second relative extreme to the first relative extreme to serve as the ratio of sensing values.

13. The driving apparatus of a touch panel according to claim 11, wherein the microcontroller calculates a sum of a plurality of sensing values of the first relative extreme portion to obtain a first total sum value, calculates a sum of a plurality of sensing values of the second relative extreme portion to obtain a second total sum value, and calculates a ratio of the second total sum value to the first total sum value to serve as the ratio of sensing values.

14. The driving apparatus of a touch panel according to claim 11, wherein the microcontroller calculates an average of a plurality of sensing values of the first relative extreme portion to obtain a first average value, calculates an average of a plurality of sensing values of the second relative extreme portion to obtain a second average value, and calculates a ratio of the second average value to the first average value to serve as the ratio of sensing values.

15. The driving apparatus of a touch panel according to claim 11, wherein if the sensing value of the first relative extreme portion is smaller than the sensing value of the second relative extreme portion, the position of the touch point on the touch panel in the first axial direction $y=L \div (2r)$, where $L$ is a distance from the first electrodes to the second electrodes and $r$ is the ratio of sensing values; if the sensing value of the first relative extreme portion is equal to the sensing value of the second relative extreme portion, $y=L \div 2$; and if the sensing value of the first relative extreme portion is greater than the sensing value of the second relative extreme portion, $y=L-(L \times r) \div 2$.

16. The driving apparatus of a touch panel according to claim 15, wherein if the sensing value of the first relative extreme portion is far smaller than the sensing value of the second relative extreme portion, $y=0$; and if the sensing value of the first relative extreme portion is far greater than the sensing value of the second relative extreme portion, $y=L$.

17. The driving apparatus of a touch panel according to claim 11, wherein the microcontroller adds the sensing value of each of the first electrodes and the sensing value of the corresponding one of the second electrodes to obtain a plurality of second axial direction sensing values; and the microcontroller uses a position of a relative extreme in the second axial direction sensing values to serve as a position of the touch point on the touch panel in a second axial direction.

18. The driving apparatus of a touch panel according to claim 11, wherein the microcontroller adds the sensing value of each of the first electrodes and the sensing value of the corresponding one of the second electrodes to obtain a plurality of second axial direction sensing values; and the microcontroller calculates a position of the touch point on the touch panel in a second axial direction by interpolation according to a relative extreme in the second axial direction sensing values and two sensing values adjoining the relative extreme respectively of the second axial direction sensing values, wherein the first axial direction and the second axial direction are perpendicular to each other.

19. The driving apparatus of a touch panel according to claim 11, wherein a low impedance direction of the conductive layer is the first axial direction.

20. The driving apparatus of a touch panel according to claim 11, wherein the conductive layer is a conductive film formed by carbon nano-tubes arranged in parallel.

* * * * *